(No Model.) 2 Sheets—Sheet 1.
W. J. LANKFORD.
HARVESTER.
No. 571,904. Patented Nov. 24, 1896.
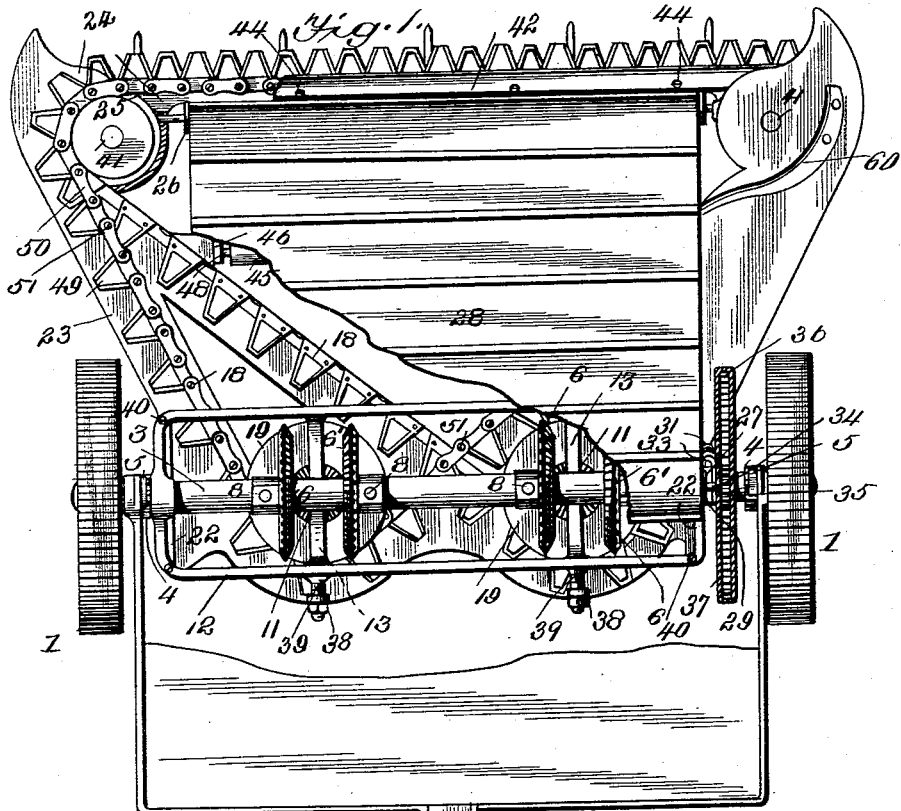
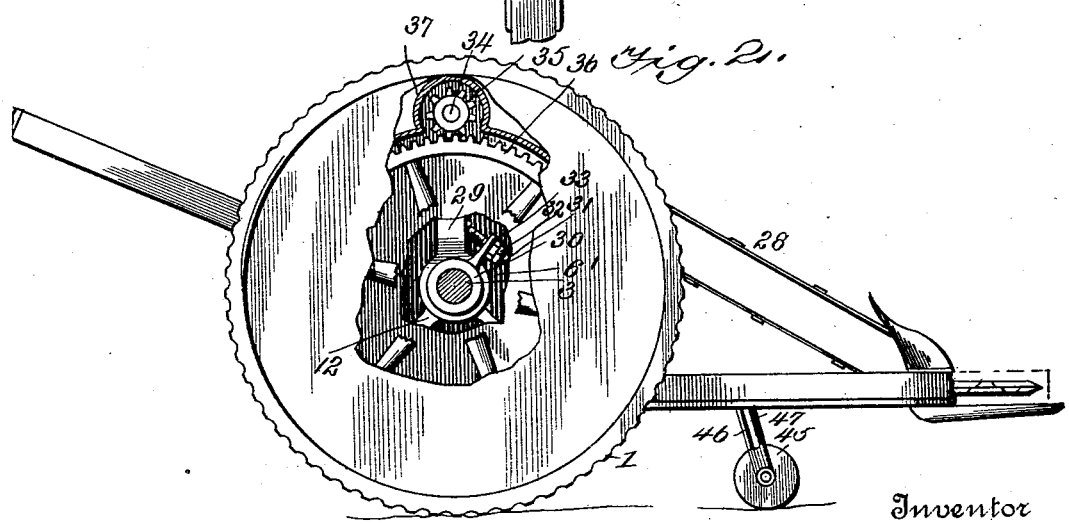
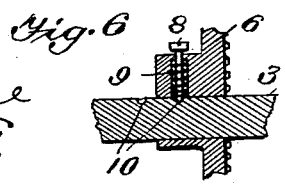
Witnesses
John Imine
W. E. Clendaniel
Inventor
Wm. J. Lankford
By T. J. W. Robertson
Attorney
THE NORRIS PETERS CO., PHOTO-LITHO., WASHINGTON, D. C.

(No Model.) 2 Sheets—Sheet 2.

W. J. LANKFORD.
HARVESTER.

No. 571,904. Patented Nov. 24, 1896.

Witnesses
John Innie
W. E. Clendaniel

Inventor
Wm J Lankford
By T. J. W. Robertson
Attorney

UNITED STATES PATENT OFFICE.

WILLIAM J. LANKFORD, OF OTTAWA, KANSAS, ASSIGNOR OF ONE-HALF TO EDWARD CHENOWETH, OF SAME PLACE.

HARVESTER.

SPECIFICATION forming part of Letters Patent No. 571,904, dated November 24, 1896.

Application filed September 19, 1895. Serial No. 563,030. (No model.)

*To all whom it may concern:*

Be it known that I, WILLIAM J. LANKFORD, a citizen of the United States, residing at Ottawa, in the county of Franklin and State of Kansas, have invented a certain new and useful Improvement in Harvesters, of which the following is a specification, reference being had to the accompanying drawings.

This improvement relates to that class of harvesters in which two endless belts of cutters are employed, and is applicable to either hand or horse power mowers and reapers; and the object of the invention is to provide a machine of this class that will be rapid and convenient in operation, durable in use, not likely to get out of order, and yet be cheaply manufactured.

To these ends the invention consists in the peculiar construction hereinafter more particularly described and then definitely claimed.

Figure 3:
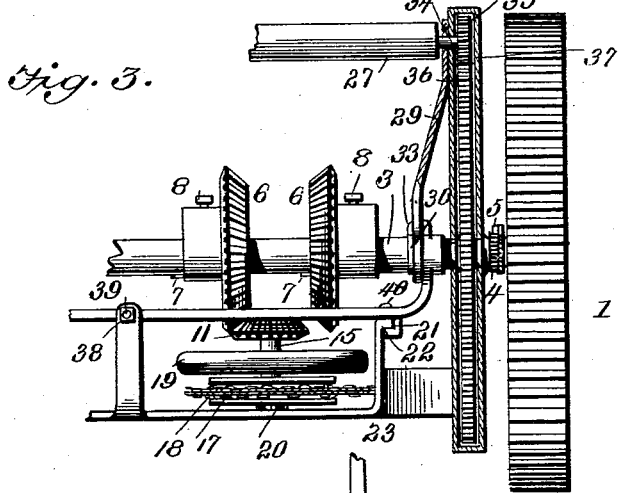
Figure 4:
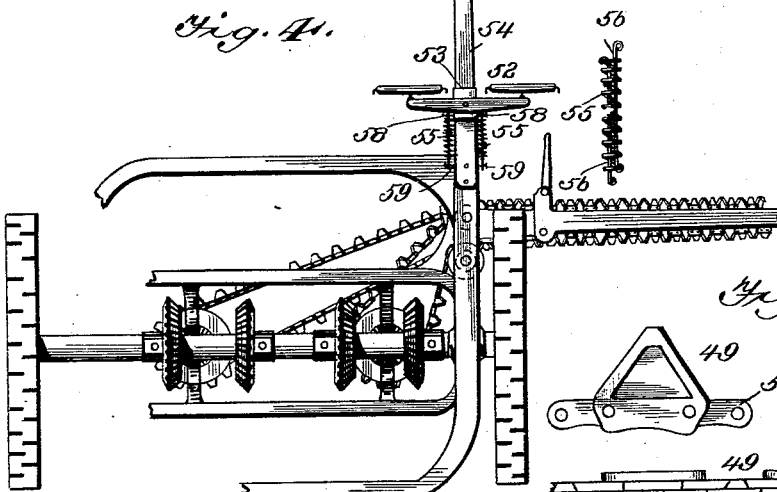
Figure 8:
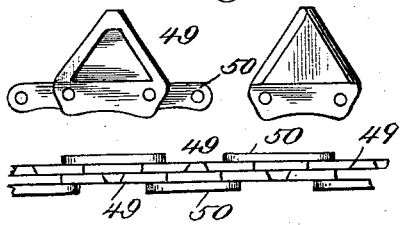
Figure 5:
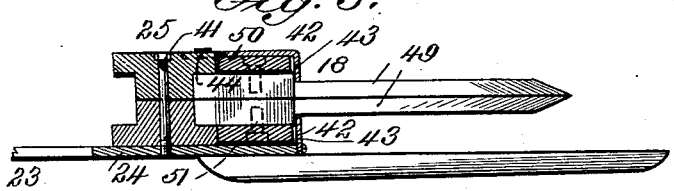
Figure 7:
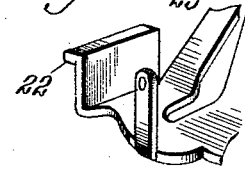

In the accompanying drawings, Figure 1 represents a plan view of a mower constructed according to my improvement which may be adapted for use either for a hand lawn-mower or to a horse-power machine, as desired by manufacturers. Some parts are represented as broken away the better to show other parts. Fig. 2 is a side view also represented with parts broken away. Fig. 3 is a rear view with part of the frame and casing removed. Fig. 4 shows the same style of harvester fitted for horse-power. Fig. 5 is a section through the cutters and pulleys at one end of the cutter-bar. Figs. 6, 7, and 8 are details which will be more fully described hereinafter.

Referring now to the details of the drawings by figures, 1 indicates the ground-wheels, mounted on an axle 3 and connected thereto in the usual manner by ratchet 4 and pawl 5. Slidingly mounted on the axle 3 are four bevel-wheels 6 6', which are prevented from turning without the axle by means of splines 7, fast on said axle and passing through grooves in the hubs of said wheels in a manner well known. Each of these bevel-wheels has a pin 8, (see Fig. 6,) which is held down by a spring 9, so as to remain in either of the holes 10 10 in the axle 3, and thus retain the bevel-wheels in the desired position in or out of contact with the bevel-pinion 11, according to whether it is desired to run the machine without cutting, as in moving from field to field, or according to which direction it is desired to run the cutters. If all the bevel-wheels are out of contact with the bevel-pinions, of course the cutters will not run. If the wheels 6 are set in working contact with the pinions 11, the cutters will run in the opposite direction to that in which they will run when the wheels 6' are in contact with the said pinions.

Underneath the axle and forming part of the upper frame 12 are two cross-bars 13, each having a bearing 14 for the vertical shafts 15, each of which shafts carries a bevel-pinion 11, a sprocket-wheel 17 for the support and driving of one of the endless chains of cutters 18, and (preferably) a fly-wheel 19. The lower ends of these shafts are set in steps formed in arms or hangers 20, depending from the upper frame 12.

Beneath the frame 12 are grooves 21, which receive flanges 22 of the lower frame 23, which carries the cutter-bar 24 and the pulleys 25, around which the cutters run at each end of the cutter-bar.

Near the front of the lower frame is set a roller 26, around which and another roller 27 passes an endless canvas or webbing apron 28. The upper roller is mounted on arms 29, set on a boss 30 on the upper frame, which arms can be adjusted to tighten the canvas by means of set-screw 31 and nut 32, which screw passes through a hole in an arm 33, rising from the upper frame to receive the nut, by screwing up which the canvas will be strained.

On the gudgeon 34 of the roller 27 is a pinion 35, which meshes with a gear-wheel 36, fast on the axle 3, and covered by a casing 37 to prevent the cut grass from clogging the wheels.

The lower frame is adjustable in the upper frame to keep the endless chains of cutters taut by the nut 38 on the screw 39, which screw is fast to the upper frame, and when the lower frame is adjusted to the desired position it can be further secured by set-screws 40.

At each end of the cutter-bar 24 are mounted two flanged pulleys 25, which turn in opposite directions on the bolts 41, firmly set in the lower frame on the cutter-bar. The flanges on these pulleys are to guide and keep the chains of cutters in their proper positions when in operation. To further keep and guide the cutters, I provide plates 42, which have vertical ribs 43, the edges of which press against the cutters and keep them in contact with each other. In order that these ribs may be adjusted conveniently, I have provided set-screws 44, by which the plates 42 may be set closer to the cutters as they become loose from use.

At each side of the lower frame is a caster-wheel 45, mounted on an arm 46, having a slot 47, by which the height of the stubble can be adjusted as desired by means of the bolt 48, screwed into the frame.

The endless chains of cutters are made up of cutters 49 and links 50, connected by screws 51, having their heads sunk into the links. The cutters are countersunk on one face, as shown in Fig. 8, while their edges on the opposite face are beveled to produce the cutting edges. Owing to their countersunk faces the cutters will, to a considerable extent, be self-sharpening as they wear.

There should be a divider (indicated at 60) at each end of the cutting apparatus to guide the cut grass upon the apron.

When the apparatus is to be used as a lawn-mower, it may be provided with a handle and grass-receiver; but as no novelty is claimed for these no illustration of them is necessary.

If the invention is to be used as a mower or reaper to be operated by horse-power, it may be arranged as in Fig. 4, in which the cutting apparatus proper is arranged at one side and the cutters pass over suitable guide-pulleys, as indicated in said figure. In this case the whiffletree 52 is mounted on a slide 53, which is capable of endwise motion on the tongue 54. On each side of the tongue is a spring 55, having two rods 56, one end of each being connected to the opposite ends of the spring and the opposite end of one being attached to a pin 58 on the slide, and the corresponding end of the other one being connected to a pin 59 on the tongue, whereby breakage would be prevented should the cutters meet with an obstruction, as the horses could travel a short distance after the machine had been stopped by said obstruction.

By the above construction a very convenient and rapidly-operating mower or reaper may be built, and one which will run very easy, as each chain of cutters runs continuously in one direction instead of stopping and starting again at the end of each stroke, as is the case with reciprocating cutters. As the cutters run one over the other and are countersunk on their contiguous faces they are to a considerable extent self-sharpening. Besides this the arrangement of the gearing allows of the cutters running in both directions, whereby after the edges of one side of the cutters have become dull the gears may be reversed and the other edges brought into use, so that double the amount of work may be done with one sharpening of the cutters that could be done with chain cutters that run in one direction only. I deem it important that the two sets of cutters are each driven by a shaft independent of the other. If the shafts are made concentric with each other, as has been proposed, they must of necessity increase the friction because they travel in opposite directions, which would necessarily cause greater friction, and thus render the mower harder to operate.

What I claim as new is—

1. The combination with a revolving axle, a cutter-bar and two endless chains of cutters, of guide-pulleys at each end of the cutter-bar, two independent vertical shafts each running in a separate stationary bearing and carrying sprocket-wheels for driving the chain, and intermediate gearing between said axle and vertical shafts, substantially as described.

2. The combination in a grain or grass cutter, of an endless chain of cutters and a supporting and guiding frame therefor, with gearing operated from the axle and a second frame carrying said gearing and adjustable on the frame carrying the cutters, whereby the cutters may always be kept taut, substantially as described.

In testimony whereof I affix my signature, in the presence of two witnesses, this 26th day of August, 1895.

WILLIAM J. LANKFORD.

Witnesses:
J. P. GOOD,
E. G. SUTTON.